Nov. 15, 1966 A. BOUDOURIS 3,286,111
SPEED CONTROL FOR SHADED POLE INDUCTION MOTORS
Filed Dec. 6, 1963
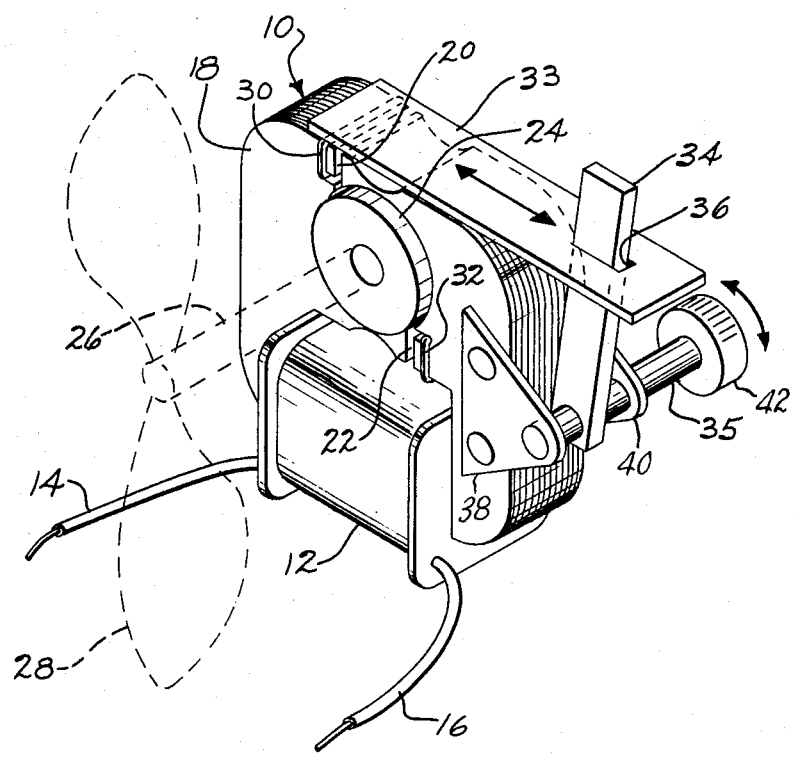
INVENTOR.
ANGELO BOUDOURIS
BY
ATTORNEYS

3,286,111
SPEED CONTROL FOR SHADED POLE INDUCTION MOTORS
Angelo Boudouris, 5856 Highland Drive, Sylvania, Ohio
Filed Dec. 6, 1963, Ser. No. 328,554
1 Claim. (Cl. 310—190)

This invention relates to a speed control for shaded pole induction motors.

Shaded pole induction motors are frequently used for driving such devices as small fans which require a very low starting torque and low power for their operation. Since the speed of a single phase induction motor is constant with a constant load, the fan must always run at the same speed. For some uses, however, variable fan speeds are desired, but the speed variation is not obtainable with any commercial shaded pole induction motor with which I am familiar.

Since small shaded pole induction motors are usually constructed with a single energizing coil wound around a stack of parallel laminations, the leakage flux from the laminations across the pole face is relatively small. Thus an unloaded motor of this character will tend to run at 80%–90% of its synchronous speed.

I have found that control of the motor speed may be obtained by controlling the flux in the laminations which forms the two opposed poles of a shaded pole induction motor, and that by varying the flux path I am able to vary the speed of the motor.

The primary object of the present invention is to provide a simple and effective means to control the speed of a single phase shaded pole induction motor.

The advantages of the invention will become apparent from the following specification, reference being had to the accompanying drawing, in which the single figure illustrates a single phase shaded pole induction motor having a speed control constructed in accordance with the present invention, diagrammatically associated therewith.

Referring to the drawing: 10 designates, in general, a single phase shaded pole induction motor having a single field winding 12 receiving A.C. power from leads 14 and 16. The field coil 12 is wound around the base leg of a conventional stack of motor laminations 18, which laminations may be slotted at 20 and 22 to form gaps separating two opposed poles, and are, of course, shaped to receive a squirrel cage rotor 24 from which a shaft 26 extends. In the drawing, shaft 26 drives a fan blade diagrammatically indicated at 28.

Shading coils, or short circuited turns 30 and 32 are provided to provide a rotating field, as is conventional.

There is, of course, a leakage flux across the interpole gap 20 which passes out of the laminations at one side of the gap and re-enters at the opposite side. By increasing or decreasing this leakage flux, the proportion of the flux cut by the rotor 24 can be varied. The present invention includes a bar 33 of magnetic material (preferably a ferromagnetic material) disposed to bridge at least one of the gaps 20, 22, and in the form shown in the drawing the bar is related only to the magnetic field in the vicinity of gap 20.

A suitable operator is provided for the bar 33 and may comprise a simple lever 34 fixed at one end to an operating shaft 35 and at its opposite end disposed in an appropriate opening 36 in the magnetic bar. The operator is preferably of a non-magnetic material. The shaft 35 is journalled in suitable magnetic plates 38 and 40 which are fixed to the side of the motor frame in any desired manner, and the shaft extends out to receive an operating knob 42. Thus rotation of the knob 42 will, through shaft 35 and lever 34, move the bar 33 back and forth across the top of the motor laminations and more or less of the bar 33 will overlie the laminations on that side of the gap 20 in which the shading coil 30 is situated. As the area of the magnetic bar overlying the laminations on the shading coil side of the gap is increased, the flow of flux through the bar will be increased and the flux available to be cut by the rotor 24 will be decreased. The speed of the motor will be thus decreased. Withdrawing the bar 33 from its overlying position, or decreasing the overlying area will have an opposite effect, and the speed of the motor will increase. Both of these results are true, of course, only at constant load.

While any suitable magnetic material may be used for the bar 33, a ferromagnetic material is preferred. It is, of course, within the purview of the invention that the bar 33 may be composite with only the area in the region of the gap being a ferromagnetic material while the portion adjacent the operating mechanism may desirably be nonmagnetic because it plays little part in the speed control process.

While the invention has been disclosed in conjunction with a specific form and disposition of the parts, it should be expressly understood that the disclosure is only for purposes of illustration and that numerous modifications and changes may be made without departing from the scope of the appended claims.

What I claim is:

A speed control for a shaded pole induction motor having a rotor, a laminated frame surrounding said rotor including an interpole gap and a shading coil adjacent said interpole gap, said control comprising in combination, an elongate body of magnetic material adjacent and parallel to one side of said laminated frame and extending over said shading coil and said interpole gap, means for sliding said elongate body lengthwise relative to said one side of said laminated frame to vary the area of said elongate body which overlies said one side of said laminated frame, whereby the quantity of magnetic flux from said laminated frame passing through said elongate body may be varied such that the flux diverted from said rotor will be varied in accordance with the position of said elongate body relative to said one side of said laminated frame, said means for sliding said elongate body relative to said frame including a shaft journaled for rotation relative to said frame on an axis normal to the direction of movement of said elongate body and a pivot arm secured to said shaft and extending to and secured to one end of said elongate body whereby angular movement of said shaft will cause said elongate body to slide lengthwise relative to said one side of said laminated frame.

References Cited by the Examiner
UNITED STATES PATENTS

| | | | |
|---|---|---|---|
| 1,600,009 | 8/1926 | Oswald | 310—190 X |
| 1,979,665 | 11/1934 | Blankenbeuhler | 310—190 |
| 2,179,331 | 11/1939 | Hancoch | 310—190 X |
| 2,670,448 | 2/1954 | Bell et al. | 310—190 X |
| 2,825,828 | 3/1958 | Wei Ching Ling | 310—190 X |
| 3,080,494 | 3/1963 | Lunden et al. | 310—190 X |

FOREIGN PATENTS

| | | |
|---|---|---|
| 876,562 | 3/1953 | Germany. |
| 212,263 | 12/1924 | Great Britain. |

MILTON O. HIRSHFIELD, *Primary Examiner.*
J. J. SCHWARTZ, *Assistant Examiner.*